Jan. 17, 1956 R. H. ZEILMAN ET AL 2,731,097
VEHICLE WITH SELECTIVE WHEEL DRIVE
FROM EITHER OF TWO MOTORS
Original Filed Sept. 17, 1945 15 Sheets-Sheet 11

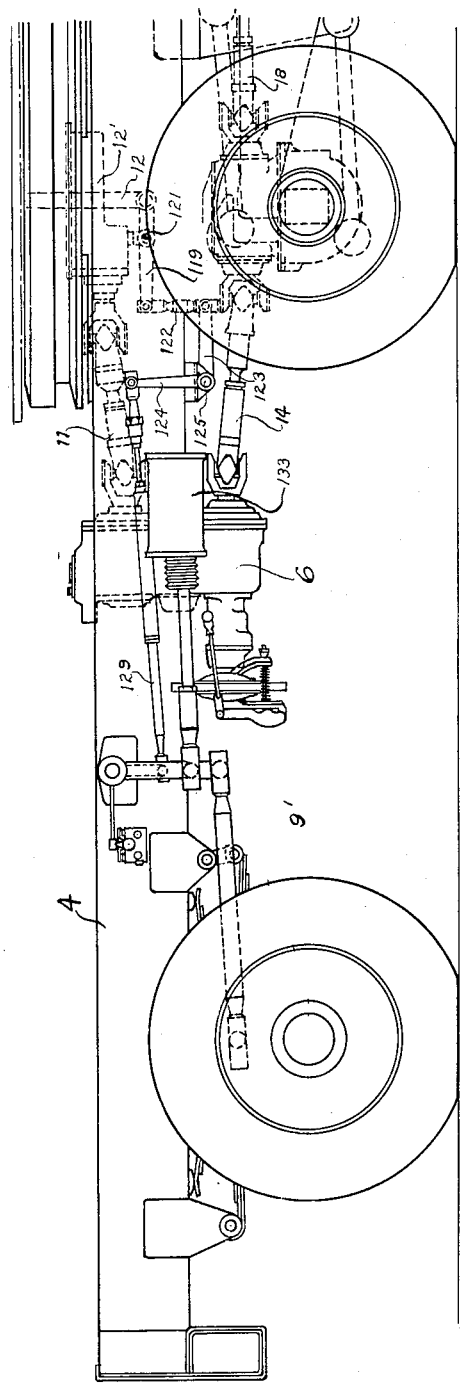
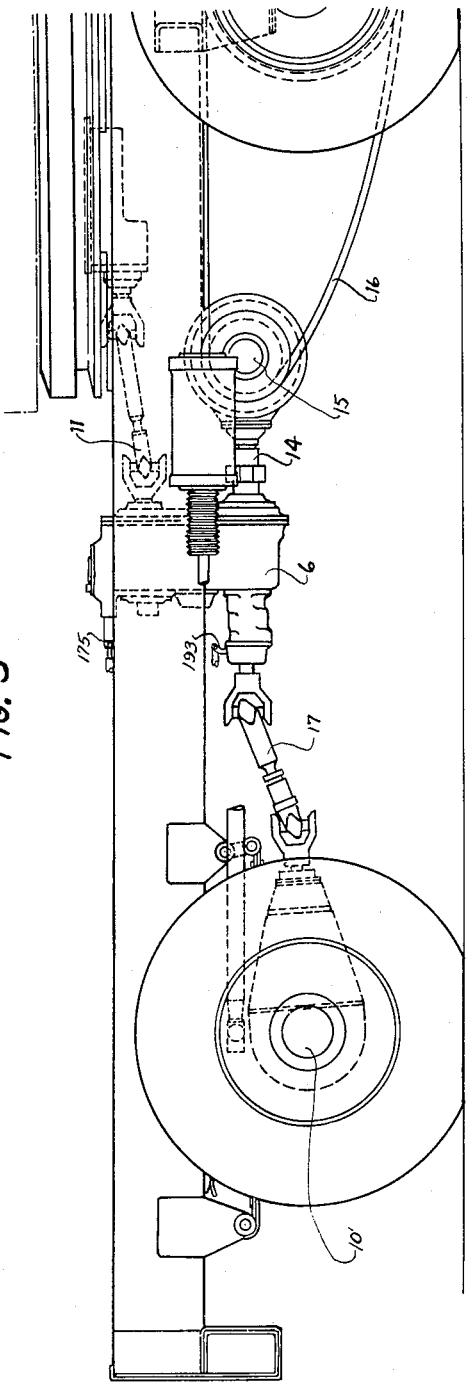

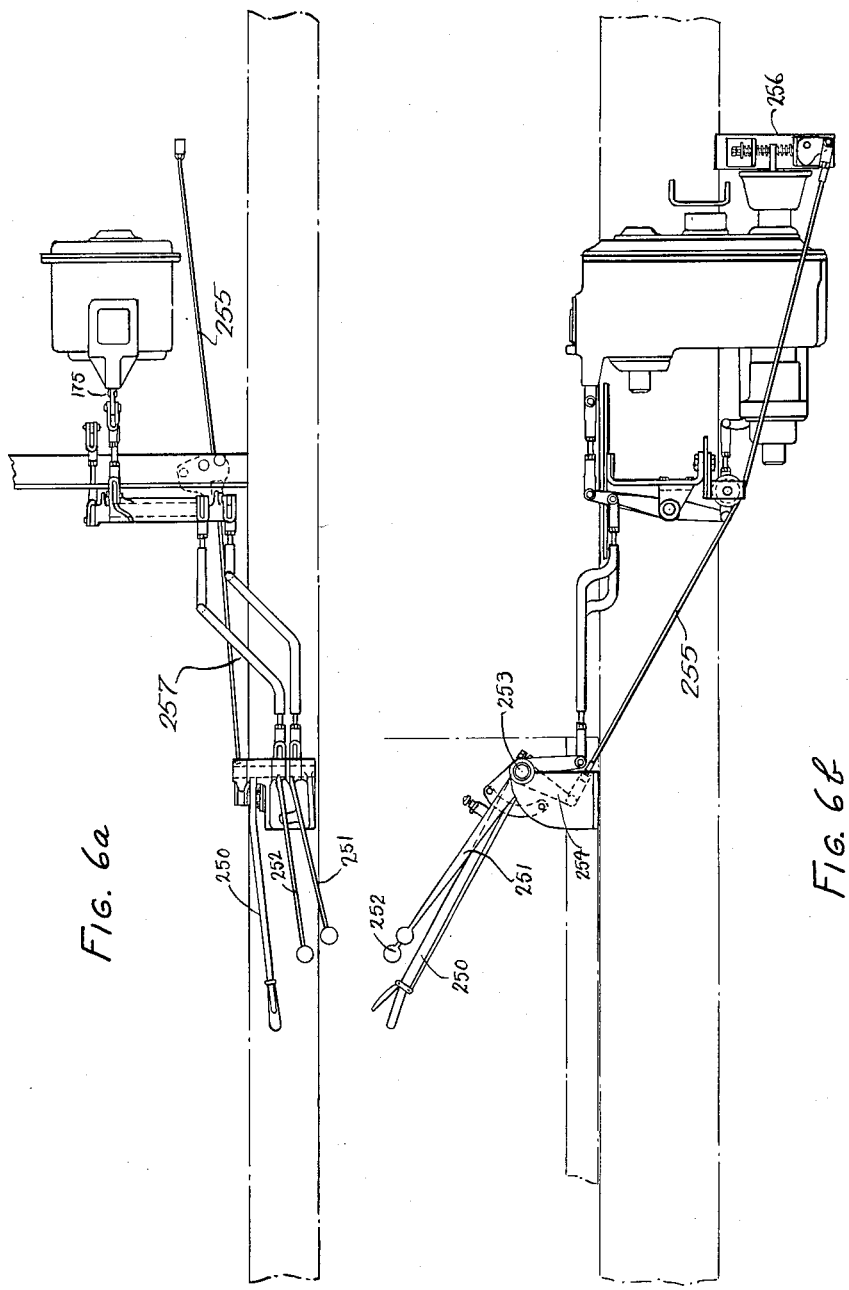

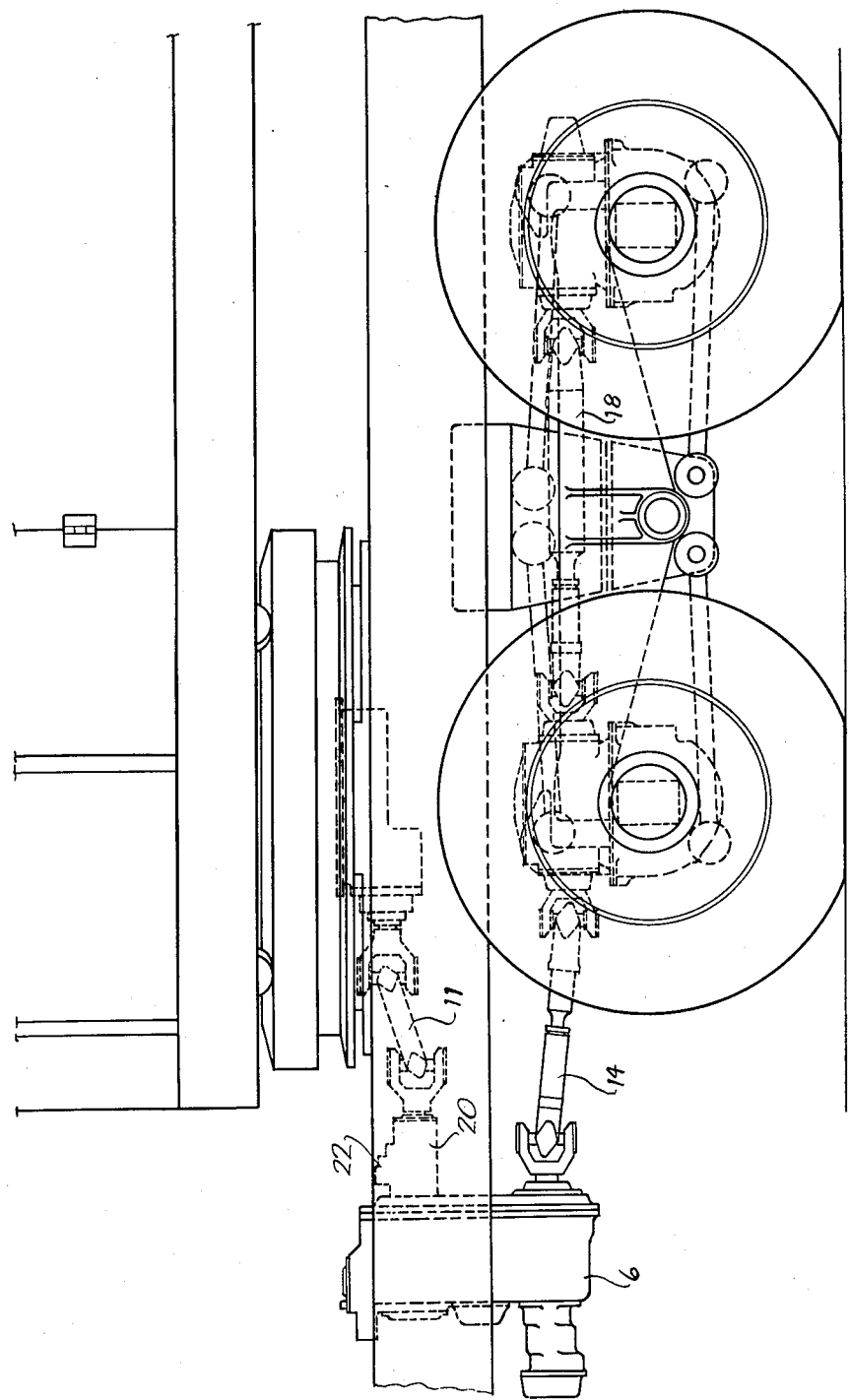

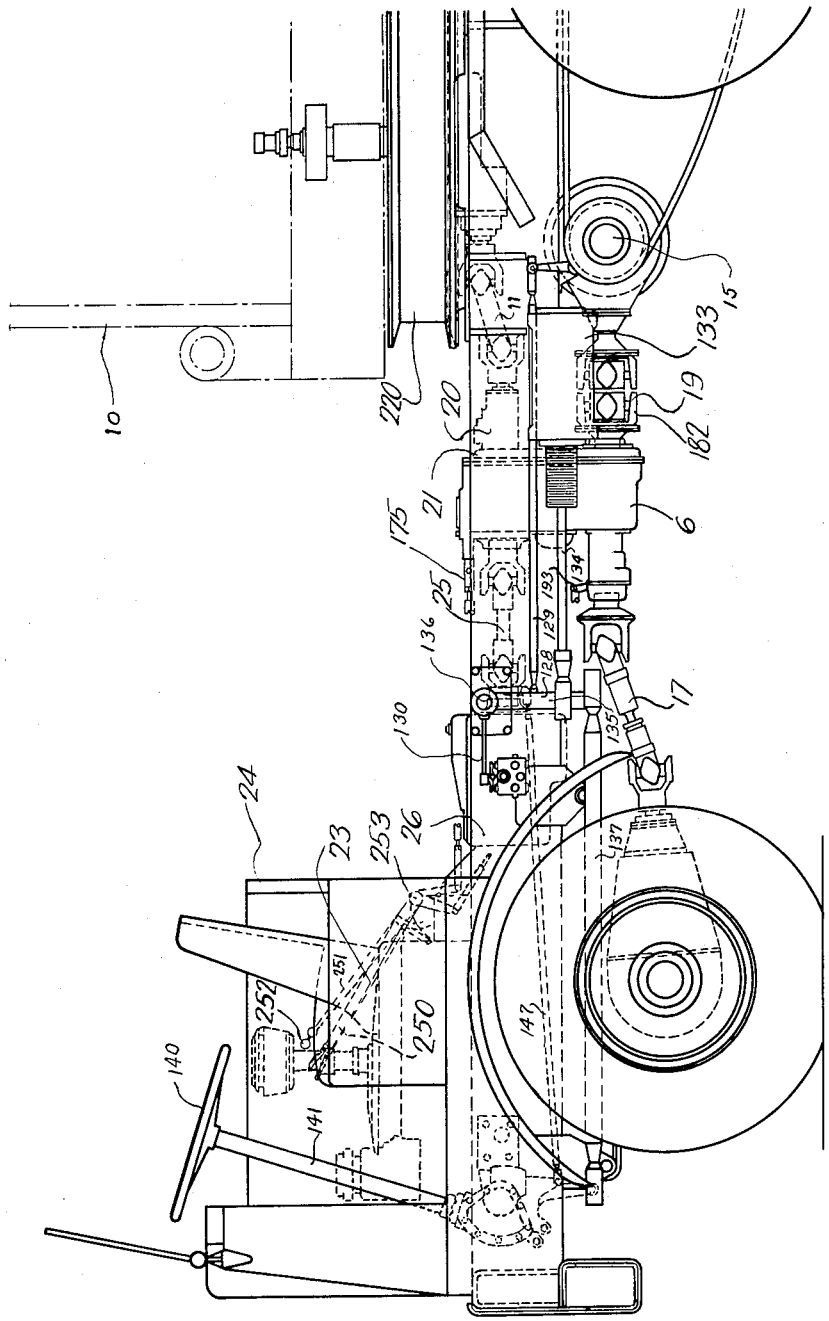

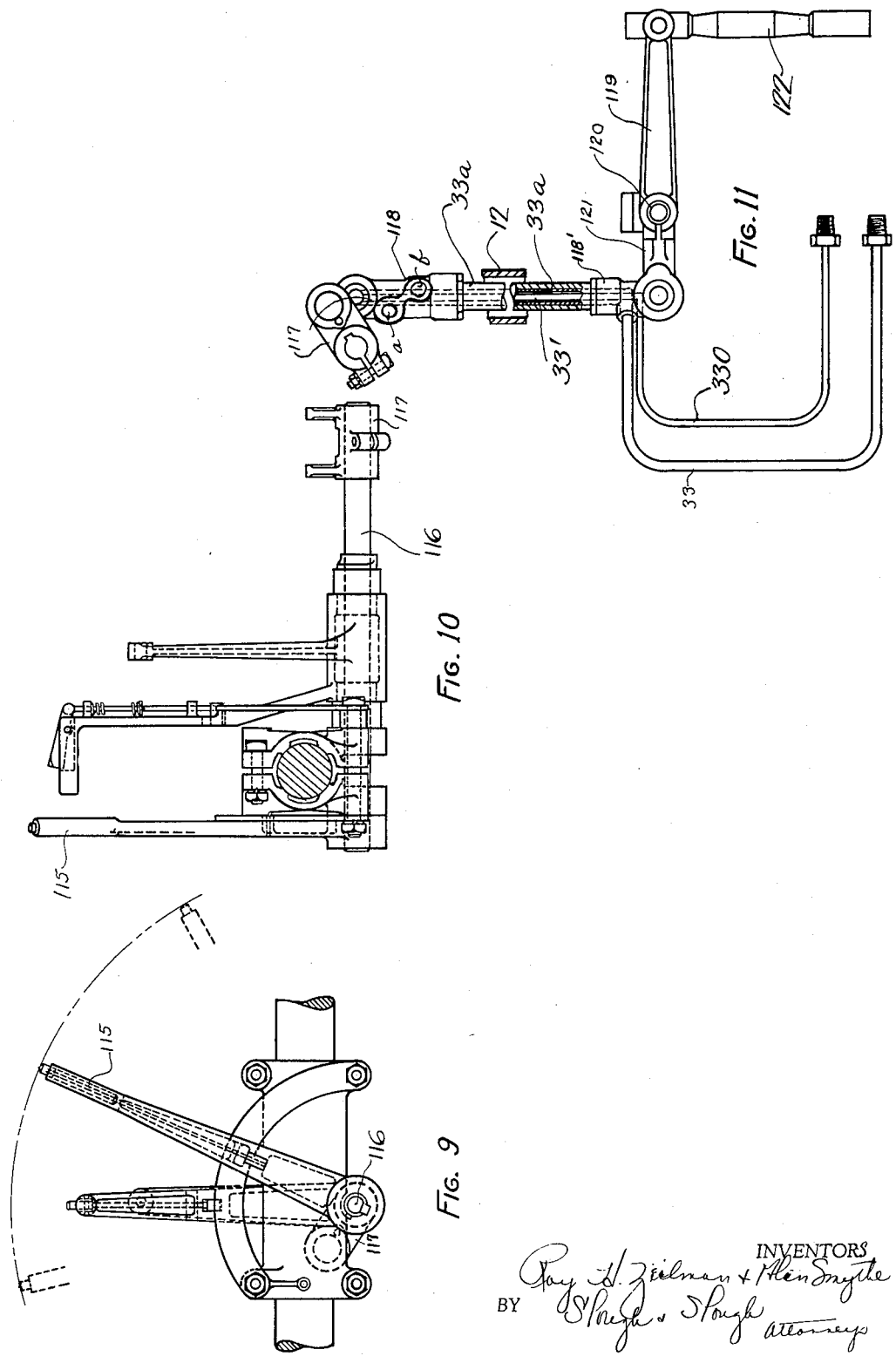

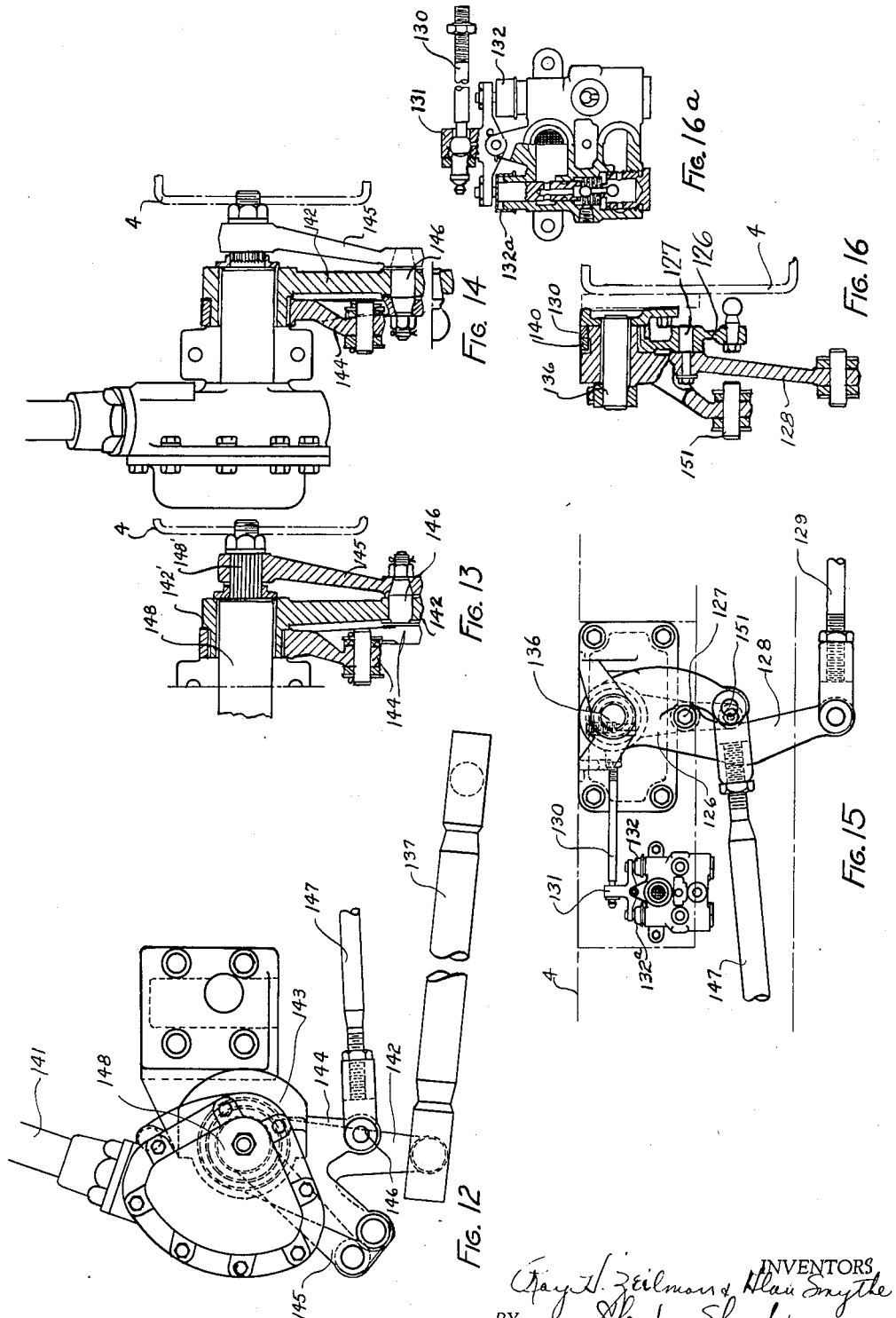

INVENTORS
Ray H. Zeilman & Alan Smythe
BY Pugh & Pugh
Attorneys

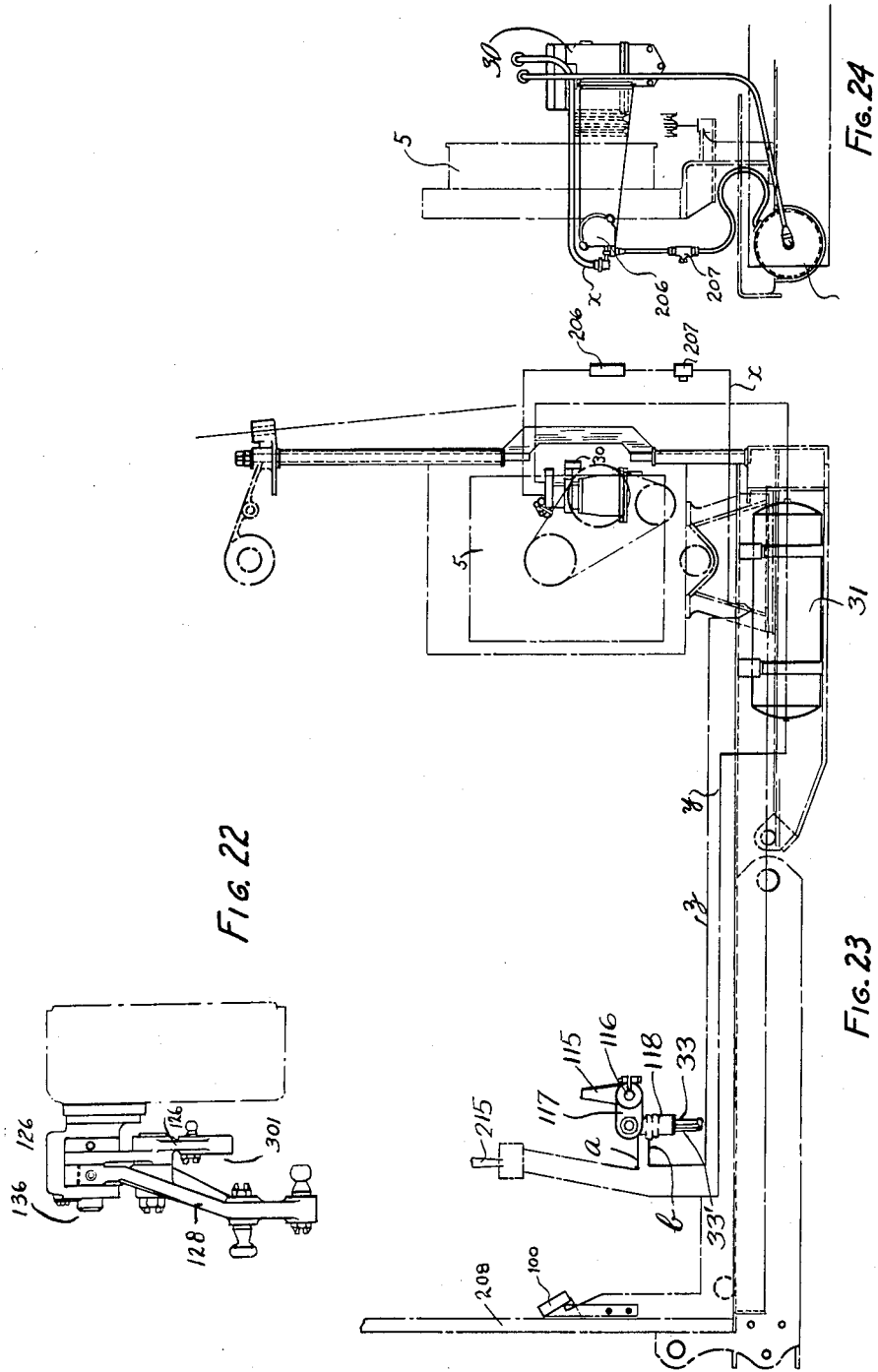

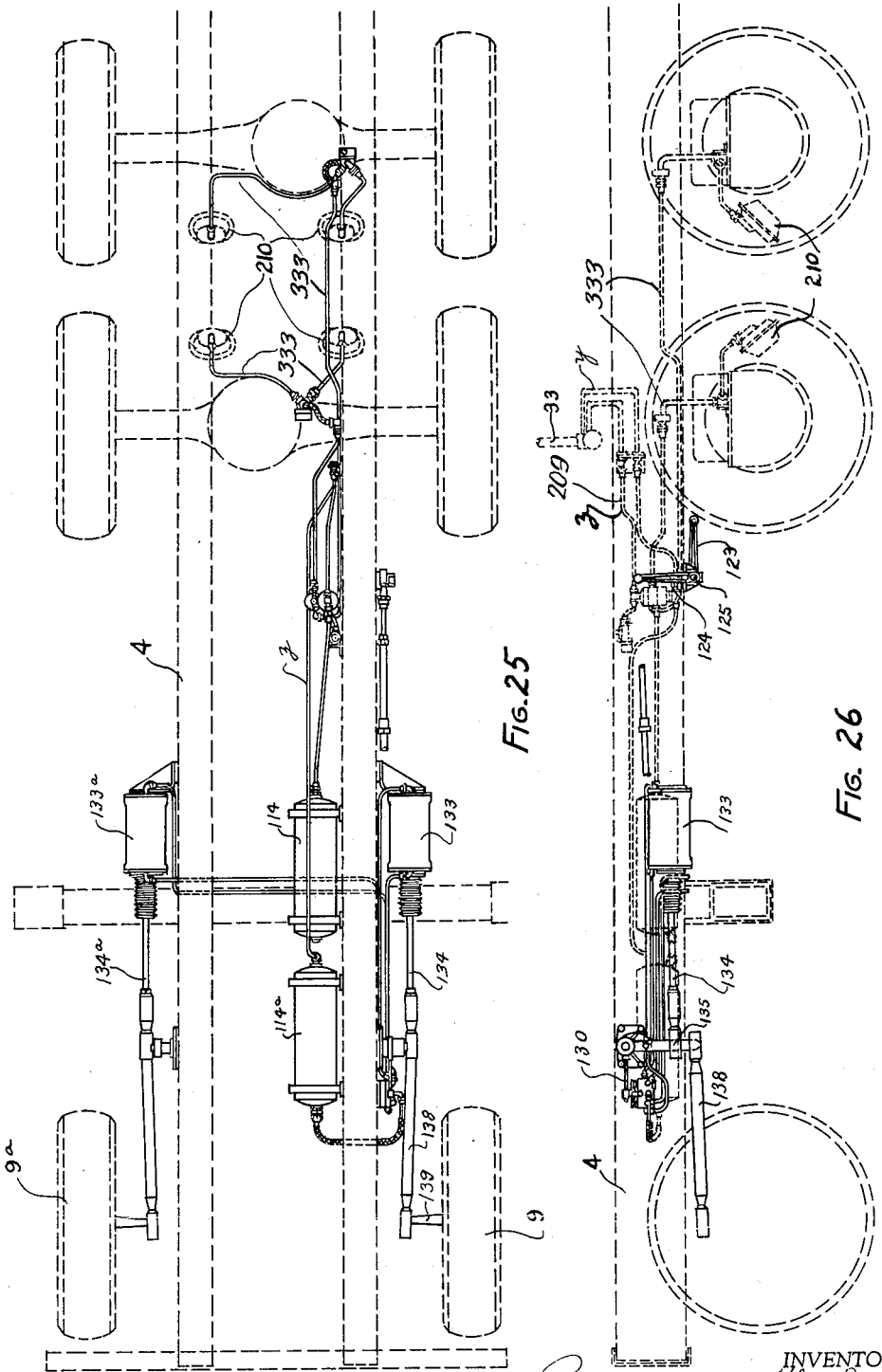

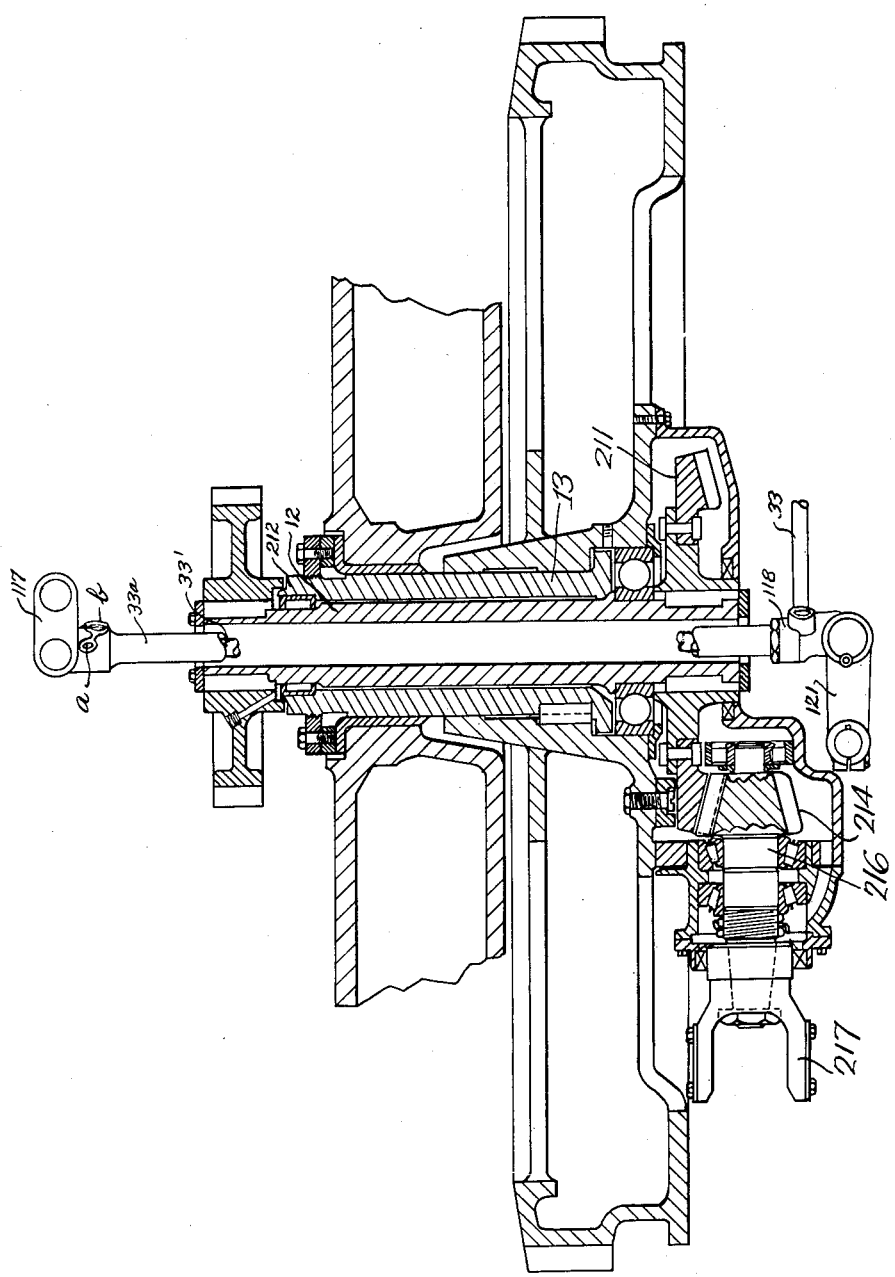

United States Patent Office 2,731,097
Patented Jan. 17, 1956

2,731,097

VEHICLE WITH SELECTIVE WHEEL DRIVE FROM EITHER OF TWO MOTORS

Roy H. Zeilman and Alan Smythe, Elyria, Ohio, assignors to Thew Shovel Company, Elyria, Ohio, a corporation of Ohio Original application September 17, 1945, Serial No. 616,868, now Patent No. 2,674,333, dated April 6, 1954. Divided and this application January 19, 1950, Serial No. 139,444.

6 Claims. (Cl. 180—23)

Our invention relates to mobile cranes and relates more particularly to the provision of an improved chassis or undercarriage of the automotive type for revolving excavators and load handling cranes of the type comprising a revolving superstructure, a boom attached thereto and an excavating bucket or load handling means associated with the boom, said chassis involving a basic structure susceptible to conversion to produce variant types of such machine.

It is an object of our invention to provide improved controlling apparatus for said chassis.

A further object of the present invention is to provide an improved transmission mechanism for self-propelled cranes of the automotive type whereby, with a highly desirable minimum of manufacturing effort and cost, a plurality of types may be evolved, by the manufacturer, by relatively slight changes, from a major basic structure which is identical for a plurality of such types.

Another object of our invention is to provide a basic mobile crane chassis which, in addition to the prime mover mounted upon the rotatable turntable located thereon, may also be provided, if desired, with an automotive prime mover on the chassis to provide alternately operable driving connections between the turntable-carried prime mover or the chassis-carried automotive prime mover, and the propelling wheels of the vehicle.

Another object of our invention is to provide a basic chassis structure for cranes of the type described in the above paragraph whereby the turntable-carried prime mover, which normally supplies power for the excavating functions of the crane and rotation of the turntable, may propel the vehicle by driving the propelling wheels thereof at low "work" speeds, and whereby, interchangeably, the automotive prime mover may be employed to propel the vehicle at either high or low automotive speeds.

Another object of our invention is to provide, in a crane of the above type wherein any or all of the above objects are achieved, and having a pair of alternately operable operator's stations, each comprising steering, braking and propelling controls, said stations comprising a more forwardly disposed driver's station from which power from the automotive prime mover is directed to the propelling wheels, and a "work" station turntable to achieve propulsion of the vehicle from the turntable-carried prime mover at low speeds.

Another object of our invention is to provide an improved transmission mechanism so positioned and constructed as to adapt it for interchangeably interconnecting either of the aforesaid prime movers to either or both of two sets of propelling wheels which conjointly support the chassis, one set of said wheels being the forwardly disposed steerable wheels and the other set being the rearwardly disposed set of two or four propelling and load supporting wheels disposed near the rear of the vehicle and disposed below the said turntable.

Another object of our invention is to provide an improved mobile crane mounted on a wheeled chassis of the automotive type, having a prime mover on the superstructure, which normally supplies power for the excavating functions, but may be adapted to propel the vehicle at low speeds, a prime mover on the chassis adapted to propel the vehicle at high or low speeds, steering and propelling controls at the work operator's station, and steering and propelling controls at the automotive driver's station on the chassis, and means for selectively clutching either prime mover to supply power to the driving wheels of the chassis.

Another object of our invention is to provide an improved vehicle of the above type which is well adapted to accurate and efficient movement during operation, so as to secure and maintain the proper relation between the position of the excavator and the work, and which is also well adapted to safe high speed self-transportation while moving long distances from one operation to another.

Another object of our invention therefore is to provide in a single vehicle the ability to efficiently perform its excavating and load handling functions and the further ability of rapid and safe self-transportation to and from the excavating and load handling operations.

Other objects of our invention and the invention itself will be apparent to those skilled in the art to which our invention appertains by reference to the accompanying drawings illustrating certain embodiment structures of our invention which are described in the subsequently following specification relating thereto and in which drawings.

Figure 3:
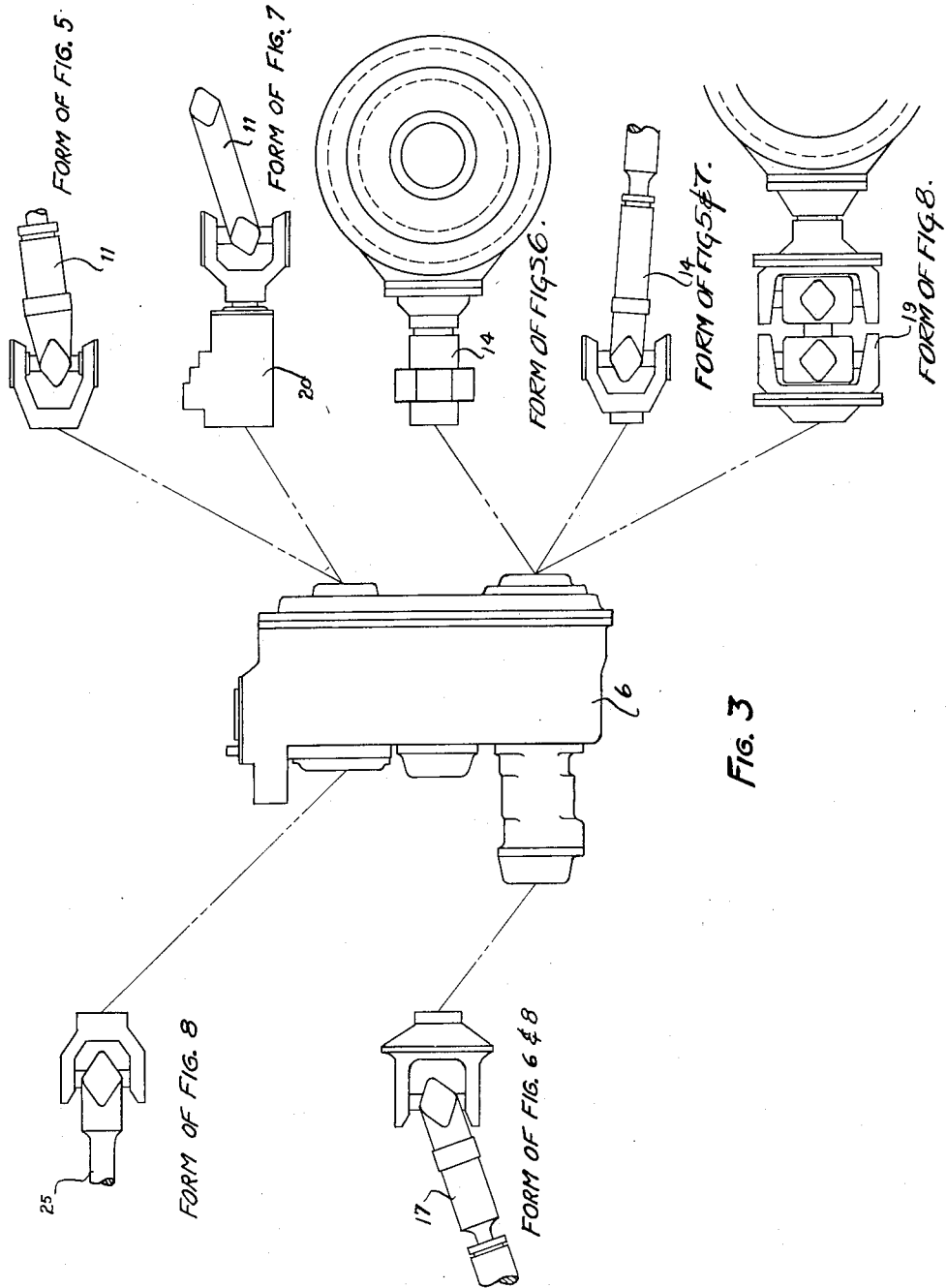
Figure 4:
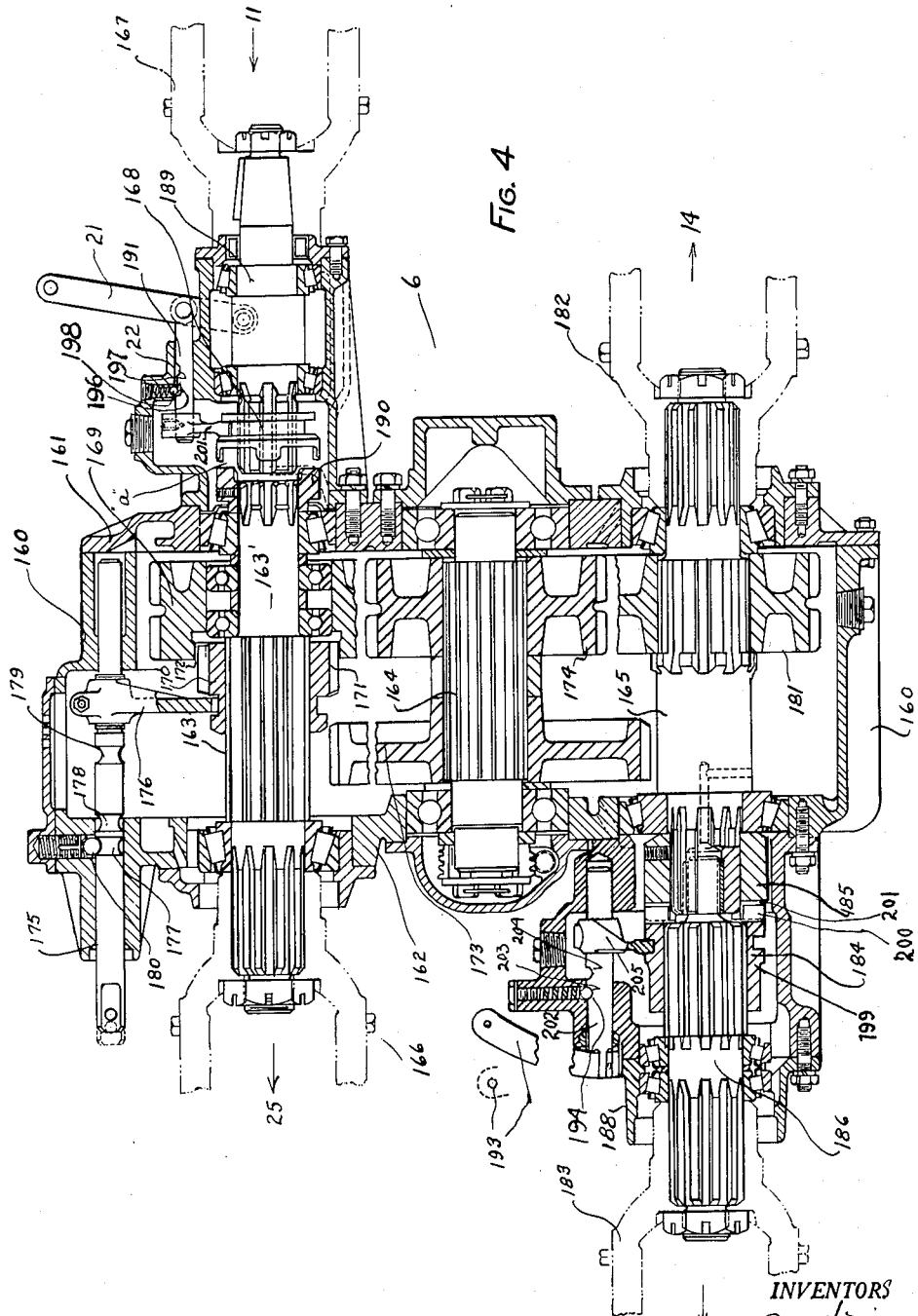
Figure 17:
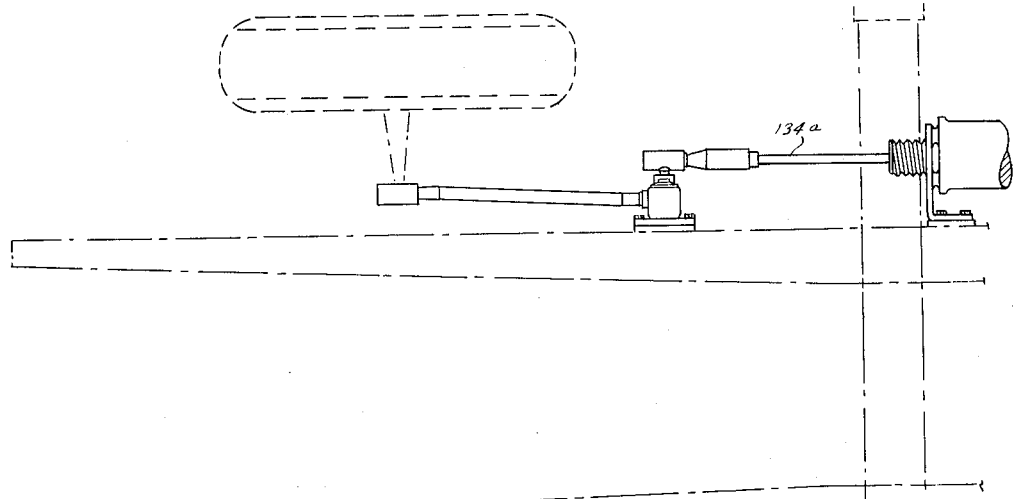
Figure 18:
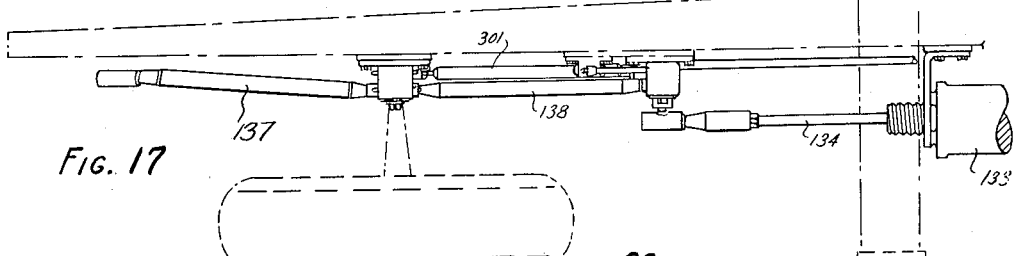
Figure 19:
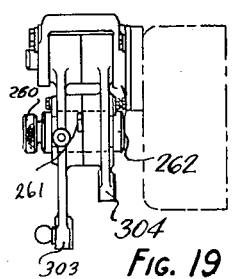

Fig. 3 is a side elevational view in outline of a substantially centrally disposed transfer case forming a part of the basic structure of our invention illustrated in Figs. 5 to 8 inclusive, and with which all such structures are equipped, and illustrating, at the two sides thereof in outline, the alternative transmission mechanisms which may interchangeably apply driving power to, or receive driving power from, said transfer case;

Fig. 4 is a sectional view of the transfer case of Fig. 3;

Fig. 5 illustrates a partial view of a self-propelled six wheel mobile crane chassis, said vehicle being propelled from the crane operator's station, only the rear wheels being driving wheels;

Fig. 6 is a view similar to that of Fig. 5 but illustrating both front and rear wheels of the crane chassis as driving wheels, the bogie of Fig. 5 being replaced in this form with the two rear wheel chain drive;

Fig. 6a is a top plan view of the controls for driving and braking of the load handling machine of Fig. 8;

Fig. 6b is a side plan view of the controls of Fig. 6a, the transfer case and brake being illustrated.

Fig. 7 is a side elevational view of a modification of the crane of Figs. 5 and 8;

Fig. 8 illustrates a crane wherein the propelling and steering functions may be accomplished either from the driver's position, or from the crane operator's position, as in the form of Figs. 5, 6 or 7;

Fig. 9 is a side elevational view of certain manually operable controlling means for controlling the operation of the said fluid system of the foregoing figures;

Fig. 10 is an end elevational view of the apparatus of Fig. 9;

Fig. 11 is an elevational view of certain elements of the said fluid system adapted to be controlled by the apparatus of Figs. 9 and 10;

Figs. 12 to 14 inclusive are views of a mobile front drive mechanism for accomplishing the steering of the form of Fig. 8 from the driver's station;

Figs. 15, 16 and 16a are views of the valve operating mechanism and associated leverage with which the steering controls of Figs. 12 to 14 and also of all forms illustrated herein are associated;

Figs. 17 to 22 inclusive are views of an alternative embodiment of a mobile front drive mechanism for accomplishing steering from the driver's station of the form of Fig. 8;

Figs. 23 and 24 are diagrammatic views of portions of the said fluid system;

Figs. 25 and 26 are plan and side elevational views, respectively, of certain essential elements of a fluid pressure system preferably employed in connection with the mobile crane mechanisms of the foregoing figures; and Fig. 27 is a transverse sectional view of the center pin construction.

Figure 28:
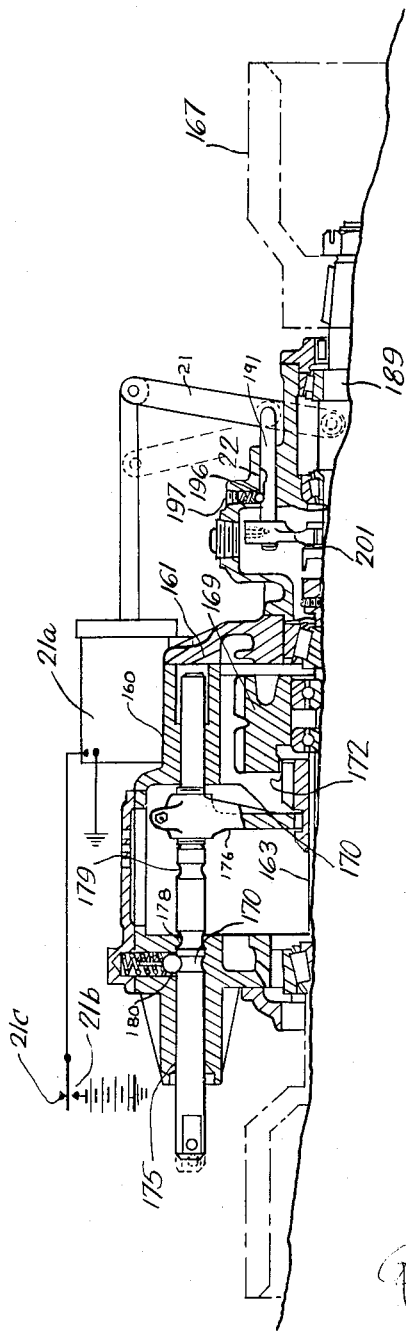

Fig. 28 is a sectional view of an alternate arrangement for operating the lever 21.

Figure 1:
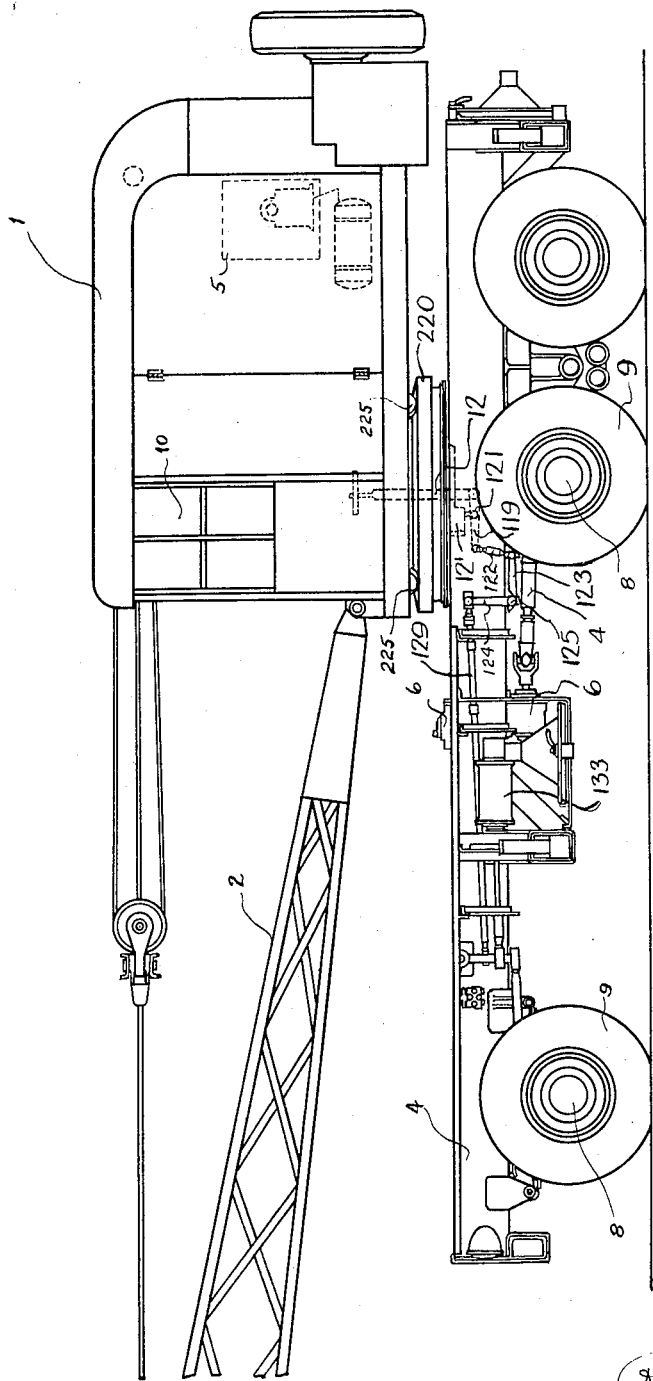
Fig. 1 is a side elevational view illustrating a mobile chassis having embodied therein improvements of our present invention.

Referring now to the drawings, in all of which like parts are designated by like reference characters, Fig. 1 shows an excavating or load handling, crane comprising a full revolving super-structure 1, a boom 2, excavating or load handling means (not shown) and a chassis 4. Power is supplied by a prime mover 5, as shown in United States patent to Wilson No. 2,022,168, through transmission means 12', disclosed therein, to a transfer case 6 and drive shaft 11 (Fig. 5) to axles 8, and wheels 9 and 9a.

Our invention, as shown in Figs. 1, 2, 5, 6, 7 and 8, is embodied in a vehicular construction wherein the chassis is either self-propelled by engine 5, and/or propelled from the automotive source of power, as in Fig. 8, and power steering means, are provided as well as a control therefor, from both the crane operator's station 10, or from the driver's station in Fig. 8.

In the structure of Figs. 1, 2, 5 and 6, propulsion of the chassis is accomplished by means of power supplied by the crane engine 5 through a universal power exchanger 6 carried by the chassis 4, shown in greater detail in Fig. 4, and power delivering connections to the driving wheels, and only the rear wheels, in the form of our invention shown in Fig. 5, are driven thereby, a dead front axle being used in this form of our invention.

In the structure of Fig. 6, the front axle 9' of Fig. 5 is replaced by a driving axle 10' and the rear wheels are of the chain drive two-wheel type used in connection with the structure of Fig. 8.

Fig. 4 shows a preferred form of universal power exchanger unit, indicated in other figures at 6, whereby a standard basic chassis structure may be universally built, and which may be readily convertible into any one of a variety of types of load handling vehicles, both at the factory, and also in the field where a previously supplied type is desired to be converted into another type.

Although said exchanger unit is susceptible to embodiment in varying form, the preferred form shown comprises a casing 160 with end plates 161 and 162, and upon which shaft bearings are provided for a plurality of power transmission shafts 163, 164 and 165. The shaft 163, being the driving shaft, is adapted, at its two ends, to receive driving power from an automotive source of power 23 or, alternatively, from the prime mover 5 which is carried by the superstructure.

The automotive engine 23 is adapted to communicate its power to the shaft 163 through the universal coupler element indicated at 166 at the forward end of the shaft 163 and from the cab carried prime mover 5 through a similar coupler element 167, through a dog clutch 168. In lieu of a clutch carried by the exchanger unit for controlling the transmission of power from the automotive engine 23 to the shaft 163, the usual automotive clutch commonly employed in automotive engines between the engine crankshaft and the automotive transmission is relied upon.

At 169, a driving gear pinion, journalled on the shaft 163 at its unsplined end 163', is adapted for the communication of driving power from a primary driving pinion 170 which is splined on the shaft 163 and, in the position shown, said pinion serves as a dog clutch element by virtue of its radial teeth 171 being projected in mesh with internal teeth 172 of an internal ring gear of the pinion 169. Alternatively, the pinion 170 is shiftable to a position wherein its teeth 171 are meshed with the teeth of a large gear 173 splined on the shaft 164. In the position of the pinion 170, shown in Fig. 4, the shaft 163 drives the pinion 169, through the internal gear teeth, to communicate driving power between said pinion 169 and the pinion 174 which is smaller than the gear 173, both said latter pinion and gear being splined upon the same countershaft 164.

The pinion 170 therefore provides a sliding clutch unit and is slidingly adapted to be positioned in three axially spaced positions by the operation of the reciprocable manually controllable rod 175 having an arm 176 with a forked lower end disposed within the peripheral groove of the pinion 170. The rod 175 is provided with three axially spaced grooves 177, 178 and 179 into either of which the spring pressed ball 180 is adapted to interfit to hold the rod 175, and also the pinion 170, in either of the three adjusted positions. The intermediate adjusted position, wherein the ball 180 interfits with the rod groove 178, is one wherein the pinion 170 is out of mesh with both the pinions 169 and 173, whereby by virtue of the movement of said shiftable clutch pinion 170, driving power from either engine to the vehicle propelling shafts, indicated in Fig. 4, at 14 and 17, may either be entirely interrupted, or supplied at two different speeds, depending upon the adjusted position of said pinion 170.

Finally, power communicated to the shaft 164 is thence communicated to the final power delivery shaft 165 by virtue of the meshed gears 174 and 181, the latter being splined on the shaft 165. The shaft 165 at the end whereby power is supplied to the propelling shaft 164 is provided with a universal joint coupler element 182, and at its other end is adapted to drive a similar universal coupler unit 183, but in the later case, a dog clutch unit, comprising dog clutch elements 184 and 185, is interposed between the shaft 165 and an axially aligned shaft unit 186, which, in turn, is journalled at 187 within a tubular extension 188 of the casing 6.

The dog clutch 168, for manually controlling the application of power from the prime mover 5 carried by the turntable, is similarly provided with an axially aligned shaft unit 189 upon which the dog clutch element 168 is splined for sliding movement to establish driving from the shaft 189 to the shaft 163. The other element of the dog clutch is shown affixed on end 163' of the shaft 163, at 190.

A manually reciprocable rod 191, journalled in the casing portion 22 and carrying a clutch operating arm 201 fitting within the groove of the slideable clutch dog 168, is adapted, upon reciprocation of the lever 21, to position the dog 168 in its inoperative position, as illustrated, or alternatively, to slide said dog to intermesh the teeth thereof with the opposing teeth of the cooperative companion clutch element 190 which is non-rotatably affixed to the end of the shaft 163 at its end 163' to establish driving torque from the shaft 11, as in Figs. 5–8 inclusive, through the stub shaft 189 and clutch elements 168—190 to the shaft 163.

To maintain the dog clutch 168 in either of the above alternative positions, the slide rod 191 is provided with a pair of notch recesses 196 and 197 within which a spring pressed ball 198 may alternatively enter in a manner similar to the ball 180 for the grooves 177—178—179, previously described.

A dog clutch and operating mechanism therefor, similar to that involving the clutch elements 170—172 and 168—190, is provided for the forwardly disposed power delivery shaft 186 to manually control the flow of driving power from the power delivery shaft 165 of the exchanger to the shaft 186 whereby power may, when desired, be delivered therefrom to the propeller shaft 17 for driving the front wheels, as illustrated in Figs. 6 and 8.

Briefly described in view of the foregoing, the slideable dog clutch element is shown at 199 splined to and slideable on the shaft 186 for interlocking clutch engagement with the companion dog clutch element 185, the teeth 200 and 201 of said elements 199 and 185, in the position shown, being intermeshed for delivery of power between the shaft 165 and the shaft 186 which, in turn, delivers power to the propeller shaft 17.

A slide rod 202, also provided with a pair of grooves 203 and 204, is adapted to be operated by the manually operable element 193 to position the spring pressed ball 194 into the groove 203, or alternatively, into the groove 204, effecting movement through an arm 205 rigidly secured to the shaft 202 which, in turn extends into an annular groove of the dog clutch element 199 to position said dog clutch in the operative position shown, or to the left thereof, where the clutch teeth are disengaged.

It will be understood that the means shown at 175, and 193 are mechanically interlinked by linkage, with manually operated levers disposed at the operator's station on the revoluble platform or at the driver's station, as best illustrated in Figs. 6a, 6b and 8, whereby the clutches may be independently or cooperatively operated to establish or disestablish the driving connections, above described, from either station.

In the alternative, an electromagnetic solenoid 21a preferably rigidly mounted on the casing 160, is adapted, when energized by electrical current flowing through its winding, to thrust the lever 21 from the dotted line position shown in Fig. 28 to the disengaged solid line position illustrated. This may be accomplished by the closure of switch contacts 21b of a switch 21c disposed at the automotive driver's station. Thus, from the forward automotive driver's station, control means are provided to interrupt the driving connection at the clutch 168—190 without the necessity of the operator's having to leave the said station to manually throw the lever 21.

Figure 2:
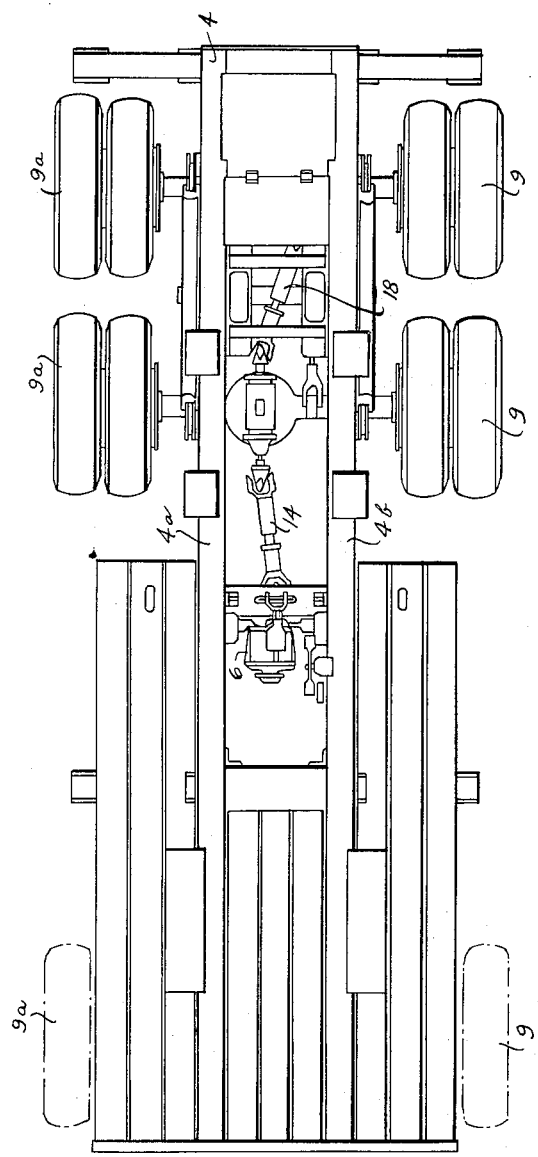
Fig. 2 is a plan view of a typical mobile chassis corresponding to that of Fig. 1 but omitting any showing of the super-structure of Fig. 1.

The power exchanger 6, as above described, is importantly carried by the chassis 4 medially between the cab driver's station 10 and the automotive driver's station 24, being located laterally medially of the longitudinally extending chassis frame elements 4a and 4b, Fig. 2, and being disposed rearwardly of the automotive transmission mechanism 26 and forwardly of the circular track 220 upon which the cab is adapted to rotate, being supported thereon by rollers 225.

It is also of considerable importance that the double ended power shaft 163 be disposed in the upper portion of the exchanger casing, and, as also shown in Fig. 4, that the double ended power delivery shaft 165 be disposed lowermost in said casing whereby the various driving and driven propeller shafts may be most readily and interchangeably, in some cases, alignable with the appropriate exchanger shafts.

In all forms, a propeller shaft 11 transmits torque from the engine 5 by means of the cab propeller shaft 12 to the exchanger 6 which contains gearing 163, 164, 165 transferring driving power to the rear wheels by means of propeller shafts 14, and additionally, to the forward wheels, in the forms of Figs. 6, 7 and 8, by propeller shaft 17 whereby the vehicle may be driven from the cab operator's position. In the form of Fig. 6, the propeller shaft 14 is keyed to a jack shaft 15 associated with the driving axle of the rear wheel by a strap or chain drive 16.

In lieu of a propeller shaft 14, in the form of Fig. 8, a double universal joint 19 is employed to transmit power to the rear wheels. In the tandem rear wheel structures of Figs. 1, 5 and 7, an interaxle propeller shaft 18 is provided to transmit driving force to the rearmost pair of rear wheels.

Further, in the form of Figs. 7 and 8, the jaw clutch 20 is employed for engaging and disengaging the cab drive, and a shaft lever 21 is used to effect such clutching and declutching action, wherefore driving from the front driver's station may be effected without interference from the rear drive.

The propeller shaft 11, in the forms of our invention shown in Figs. 1, 5 and 6, enters the exchanger at "a" as shown in Fig. 4, in a similar manner to that in which the propeller shafts 14 and 17 are shown entering the same in Fig. 4, and the jaw clutch housing 22 of Figs. 7 and 8 is dispensed within these forms.

The vehicle illustrated in Fig. 8 is a four-axle carrier with all four wheels driving, steering being accomplished, if desired, from the driver's station, and the propelling function, in this form of our invention, may be accomplished either through the engine 23 from the driver's station 24 by means of the propeller shaft 25, auxiliary transmission 26, and exchanger 6, or from the crane engine 5, at the crane operator's position 10, as hereinbefore described. The addition of the driving means and the power steering control, later herein described, at the crane operator's position enables the vehicle to be steered and propelled alternatively from the crane operator's station or driver's station at low speeds as provided for crane operation, or at high speeds, as provided for motor transportation from the driver's station, by selectively clutching either the engine 23 or the prime mover 5 at 20, to supply power to the driving wheels of the chassis.

The driving controls illustrated in Figs. 6a and 6b and dotted in Fig. 8 are used by the operator of the chassis when steering from the driver's station and are preferably mounted at the right hand side thereof, as best shown in Fig. 8.

In Figs. 6a and 6b is illustrated an emergency brake lever 250, a declutch lever 251, and a transfer case shift lever 252 mounted upon a cross shaft 253 mounted to the rear of the engine 23. The emergency brake lever 250 by means of a bellcrank lever 254, a cable 255 operates the brake mechanism 256, when desired, and the lever 252 is adapted by means of a connecting rod 257 and suitable linkage to operate the rod 175 projecting forwardly from the power exchanger unit to dispose the rod in a preferred position to either interrupt the power delivered to the exchanger unit or to supply the same at different speeds as hereinbefore described.

When a combination unit of the type shown in Fig. 8 is desired and a dead front axle is provided, as in Fig. 5, the lever 251 may be omitted from the controls provided, but where a live front axle is used, as in the form of Fig. 6, the lever is provided as in the illustrated controls.

Aside from the special controls herein described which are located at the forward driver's station, it will be understood that the usual automotive truck controls commonly employed for trucks, including the steering wheel, clutch pedal and gear shifting lever to operate the automotive mechanisms associated with said station, are mounted in substantially the same positions and operated in the same way as in the usual truck driver's station.

Fig. 7 is an alternative form of the structure of Fig. 8, a tandem arrangement being substituted for the rear wheels of Fig. 8, such tandem arrangement being similar to that shown in connection with the structure of Fig. 6.

It is to be understood in connection with the various forms of our invention herein illustrated and described that different forms of propeller shafts are illustrated and may be interchanged, when desired, the particular form thereof constituting no essential part of our invention, other than that used in connection with the engaging and disengaging of drive from the crane operator's station, as shown in Fig. 8.

Steering is accomplished in all structures from the crane operator's station, by means of the fluid steering system of Figs. 9 and 20 inclusive, hereinafter described, and from the station 24 in Fig. 8 by the steering controls at the driver's station or from the crane operator's station in such form aided by means disposed adjacent the station 24.

Fluid power is supplied for steering, as best illustrated in Figs. 22 to 24 inclusive, from the crane operator's station 10, by an air compressor, said compressor driven by the engine or other prime mover 5, and compressed air being communicated therefrom through tubes x, y and z to receiver 31, swivel joint 118, tube 33, and receivers 114 and 114a in the chassis.

An air reservoir or receiver tank 31 is also provided on the revoluble platform and air is supplied from the compressor 30 to said receiver through the line x, the pressure in said line being, at all times, limited by virtue of the provision of a pressure responsive engine speed governing regulator device 206, Figs. 2, 3 and 24 which, in a well known manner, modifies the effect of the usual engine governor to decrease the speed of the engine, indicated at 5, to an appropriate speed to maintain the pressure in the line x at the maximum predetermined by the adjustment of the governor regulator 206.

At 207, also, there is indicated the interpositioning of an exhaust type safety valve in the line x, the function thereof being to more quickly reduce the pressure in the line x than the regulator valve 206 can accomplish due to the relatively slow decrease in speed which can be effected by said regulator due to the inertia of the heavy engine parts.

The pressure in the line x is communicated through conduit y to a pressure gauge 100 on the instrument panel 208 at the crane cab operator's station 10, in the usual manner.

Figure 20:
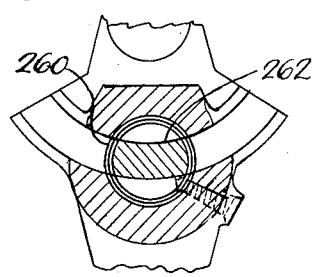
Figure 21:
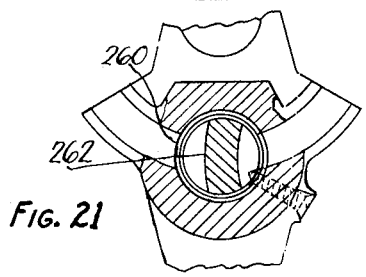

At 215, an operator controllable valve is indicated, subject to the control of the operator for steering by air pressure power supplied from the receiver through a tube 33, which comprises a rigid outer pipe 33a within which there is telescoped a smaller tube 33' through the line z, Fig. 23, to the wheel brakes 210, through one of which is disposed in operative relation to the brake band of each of the vehicle wheels and more importantly to the rear vehicle wheels, through appropriate connection lines, shown in Figs. 20 and 21.

The inner and outer concentric pipes 33a and 33', respectively, in turn, are loosely telescoped within the rotatable vertical propeller shaft 12, a fragment thereof being merely indicated in Fig. 5, and being elsewhere indicated in Figs. 1, 2 and 20.

The innermost air conducting pipes 33' and 33a are rigidly connected together mechanically at their upper and lower ends but without any intercommunication between the interior of the pipe 33' and the space between pipe 33' and the relatively outer pipe 33a, there being flexible extensions at the ends of both conduit passages, as indicated at 33 and 330, Fig. 11, and as represented by the horizontal lines a and b, Figs. 11 and 27, for the upper end.

Incidentally, as elsewhere herein related, the entire pipe assembly comprising the outer pipe 33a and the inner pipe 33' is vertically longitudinally reciprocable in order to mechanically reciprocate the lever 119 shown in Fig. 11, whereby the mechanical link 122 may be longitudinally reciprocated for purposes of performing the steering function.

Steering is controlled, as shown in Figs. 9 to 11 inclusive, from the crane operator's station, by movement of a hand lever 115, or wheel, if preferred, said lever transmitting rotary motion to a shaft 116 keyed therewith and crank 117, which moves a swivel joint and tube assembly 118 in a vertical direction within the cab propeller shaft 12, whereby the tube 33a, which encases the inner tube 33', is reciprocated in either vertical direction.

Movement of such swivel joint and tube assembly 118 then in such vertical direction transmits swinging motion to the crank 119 through the shaft 120 and crank 121 and a connecting rod 122 transmits this motion to a crank 123 and crank 124 through shaft 125 (Fig. 1).

The unitary longitudinally reciprocable assembly 118, which is longitudinally reciprocable to communicate controlling movement from the steering lever 115 to the steering cranks 119 and 124 and valve operating cranks 122, 129 and 130, to operate the steering control valve, shown in Fig. 16a, and therein generally indicated at 132 and 132a, and additionally supplying two concentric non-rotatable conduits for supplying compressed air for steering and braking the wheels, is, per se, novel.

Also, the provision of the said assembly 118, extending loosely within the propeller shaft 112 which, in turn, is telescoped within the center pin 212, permits rotation of the propeller shaft 112, to drive the ring gear 211 affixed to its lower end, whereby propelling power may be delivered by said ring gear to a pinion 214 on the short propeller shaft 216 which, by a universal joint connector element 217, is adapted, through a sutable short propeller shaft in the form shown in Fig. 27, to communicate power to the power exchanger power shaft 163 in a simple expeditious manner and at proper range of rotational speeds for said exchanger power shaft 163.

We therefore consider that the concentric disposition of the tubular propeller shaft 112 and the concentric pipe assembly 118, which also acts as a reciprocable motion communicating link, is an important combination of elements contributing to the successful solution of the problem herein presented of which said power exchanger and its positioning on the chassis is another important element.

The crank 124 also oscillates the "wobble" lever 126, shown in Fig. 15 about the fulcrum 127 on lever 128 through the connecting rod 129 (Figs. 1 and 5). Connecting rod 130 pivotally attached to an extending end of the lever 126 then activates a rocker arm 131 to operate either the valve 132 or valve 132a to open and admit air from the air tank or receiver 114 to the relatively opposite ends of cylinders 133 and 133a to exhaust any air trapped therein by the pistons (Figs. 8, 15, 16 and 20).

Generally speaking, the levers of Figs. 9 and 10 are mounted on the rotatable crane superstructure in the manner shown for similar levers in the prior patent to E. J. Wilson, No. 2,099,044 of November 16, 1937.

Piston rods 134 and 134a are pivotally connected to cranks 128 and 128a, respectively, at 135, and movement of said piston rods causes cranks 128 and 128a to pivot about their fulcrums 136, and produce movement of draglinks 137 in relatively opposite directions. Draglinks 137 are connected to wheels 9 and 9a through steering arms 139 and conventional automotive steering wheel spindles, mounted on vertical king pins. The motion of the said draglinks 137 produces rotary motion in a horizontal plane, in the steering spindle and wheel assembly, which rotary motion causes the wheels 9 and 9a to cut or change their angle with the longitudinal axis of the chassis, and steer the vehicle.

As soon as movement of the hand lever 115 and its associated cranks, shafts and connections is stopped, a further movement of crank 128 produced by piston in cylinders 133 and 133a and piston rods 134 and 134a, since valve 132 or 132a is still open and admitting pressure to the cylinders, moves fulcrum 127 on lever 126 so as to close the open valve and stop movement of the steering wheels. Due to a limited amount of clearance 140 between "wobble" lever 126 and crank 128 at their relatively telescoped hub portions, the hand lever 115 may move only sufficiently to open valve 132 or 132a until the cut of wheels 9 and 9a changes, permitting the piston to move the crank 128 and fulcrum 127, when hand lever 115 may move further to follow up this movement. In this manner, the degree of cut of the steering wheels 9 and 9a is definitely related to the movement of and controlled by lever 115.

Conversely, any change in the cut of steering wheels 9 and 9a due to an external force, transmits motion to crank 128 through steering arm 139 and draglink 137, and moves fulcrum 127. If hand lever 115 is held in a fixed position, lever 126 rotates on its pivot 127, causing valve 132 and 132a to be opened through connection 130, admitting pressure to cylinders 133 and 133a in a manner to oppose motion of wheels 9 and 9a through crank 128, pistons and piston rods 134 and 134a. In this manner, wheel fight shimmy and drifting of the vehicle from its selected course is largely prevented.

While this description deals generally with a power steering device using a fluid as the power transmitting means, electricity may also be used to transmit steering power, if collector rings and brushes are substituted for the swivel joint, switches for the valves, and an electromotive element, such as a motor or solenoid is substituted for the cylinders and pistons.

While this device employs two cylinders for steering, a tie rod is used in the manner well known to the automotive art to connect the steering knuckles and produce the correct steering geometry. A single steering cylinder may also be used, if desired.

The steering mechanism which has been described hereinbefore has, it must be noted, been controlled solely from the crane operator's station by means of the steering lever 115 mounted adjacent thereto and hence is adapted for use with all forms of our invention as exemplified by the variant cranes and motor cranes of Figs. 1, 2, 5, 6, 7 and 8, whereas steering from the driver's station is accomplished only in the form of Fig. 8 shown herein, and, as stated supra, preferably only when the crane is in transit on ordinary highway travel.

A preferred arrangement of a front steering apparatus, so-called, as shown in Figs. 12 to 16a comprises an automotive steering wheel 140 adjacent the driver's station 24, the steering rod 141 being geared to a steering lever 142, at 143, to transmit steering movement from the wheel 140 through the draglinks 137 and the steering knuckles 139 to the wheels 9 and 9a.

A lever 144 and crank 145 respectively are disposed on opposite sides of the lever arm 142 and the lever 144 is loosely journalled upon a collar 142' thereof, said collar being rotatably mounted upon the bearing 148. The crank 145 is however securely journalled upon a knurled end portion 148' of the bearing 148 and is bolted through the frame 4. A connecting rod 147 carried by the lever 144 is secured to the crank 128 by a pin 151, said crank 128 pivoting about the fulcrum 136, as stated in connection with the power steering mechanism, as hereinbefore described.

Thus, to achieve front steering, the lever arm 142 and crank 145 are secured together by means of a pin 146 shown in Fig. 13 wherefore the drag links are moved as described by the steering wheel 140 of crane and motor crane.

When it is desired to steer from the crane operator's position, it is merely necessary to reverse the pin 146 and to secure the levers 142 and 144 together, the same being freely movable about the bearing 148, so that movement of the draglinks 137 by means of the cranks 128 and 128a is possible without interference.

Alternatively, in lieu of the front steering apparatus of Figs. 12 to 16a inclusive, we may provide front steering apparatus of the type shown in Figs. 17 to 22 inclusive wherein the drag link 137 instead of being pivoted upon the lever 128 is pivoted to an intermediate lever mechanism 300, disposed between the front steering shaft and the wobble lever 128 and secured to the frame 4, as shown. Said lever mechanism 300 comprises a pair of levers 303 and 304 pivoting about the fulcrum 306, a connecting rod 301, secured to the lever 304 at one end and to the lever 126 at the other end communicating steering effort from the drag link to the wobble lever 128.

A selector wheel 260 is provided in place of the pin 146, lever 144 and crank 145 arrangement to selectively engage either the front steering mechanism or to permit steering from the crane operator's position. Said wheel 260 is secured to the lever arm 303 and is provided with a movable female member 261 adapted to engage a male member on the cam 262 carried by the relatively shorter rear lever 304 to which the connecting rod 301 is secured.

When it is desired to steer the chassis from the crane operator's position, the rear lever cam is disposed by means of the selector wheel 260 in the position shown in Fig. 20 wherefore the levers 303 and 304 are free to operate independently of each other. When steering is desired accomplished from the driver's position, the two levers 303 and 304 are secured together, as by means of the pin 146 in the arrangement of Fig. 14, by means of turning the cam 262 as in the position shown in Fig. 21.

Thus, when steering from either position, the crane operator's station or from the driver's station, is desired, the same can be effected and, as stated hereinbefore, propulsion is possible from controls at either position. Therefore, in a basic chassis structure (Figs. 1, 2, 19, 20) only slight changes need be made to produce such variant forms as the structure of Figs. 1, 5, 6, 7, 8 and doubtless other combinations.

It will be appreciated that various changes may be made in the various linkages and mechanical elements shown herein without, however, departing from the spirit of my invention and the scope of the appended claims.

We claim:

1. In a mobile shovel, crane or excavator having a vehicle chassis supporting propelling wheels therefor, a superstructure journalled upon said chassis and adapted for rotation thereon, a prime mover source of power carried by the superstructure driven at low speeds for propulsion of said chassis, and an automotive source of power carried by the chassis forwardly of said superstructure driven at relatively higher speeds for effecting travel of the vehicle, a universal power exchanger carried by the said chassis, means associated with said power exchanger and interchangeably receiving power from either said source, a pair of power delivering connections from said exchanger connected to said driving wheels of the vehicle, one of said connections transmitting driving torque to a set of rear propelling wheels of the vehicle and the other of said connections transmitting driving torque to a forward set of propelling wheels of the vehicle, clutch means associated with the said exchanger whereby either source of power may be selectively engaged to propel the vehicle through said connections at low or high speeds, and gear shifting means for the exchanger to vary the ratio of power transmission between the said power receiving means thereof and power delivery shafts thereof.

2. In a mobile shovel, crane or excavator chassis, supporting propelling wheels therefor, a rotatable turntable associated therewith comprising a tubular center pin mounted upon the said chassis, a superstructure carried by the said turntable, a prime mover source of power carried by the superstructure, a universal power exchanger carried by said chassis, means connecting said power exchanger with said prime mover whereby said power exchanger may receive power through said center pin and power receiving connections, said universal power exchanger being associated with power delivering connections and delivering said power through power delivering connections to driving wheels of said chassis, said chassis having mounted forwardly thereon an automotive source of power, automotive transmission means manually controlled to drive said wheels from said automotive source of power at relatively high speeds for effecting travel of said vehicle, said exchanger receiving power from either source of power and said chassis being steered from either the crane operator's position or the driver's station when said automotive source of power associated with the chassis is selectively engaged.

3. In a mobile shovel, crane or excavator having a vehicle chassis supporting propelling wheels therefor, a superstructure journalled upon said chassis and adapted for rotation thereon, a prime mover source of power carried by the superstructue driven at low speeds for the propulsion thereof, and an automotive source of power carried by the chassis forwardly of said superstructure driven at relatively higher speeds for effecting travel of the vehicle, a universal power exchanger carried by the chassis, means connecting said power exchanger with said prime mover and said automotive source of power whereby said power exchanger may receive power from either said source, a pair of power delivering connections associated with said exchanger and connected to said driving wheels of the vehicle, one of said connections transmitting driving torque to a set of rear propelling wheels of the vehicle and the other of said connections transmitting driving torque to a forward set of propelling wheels of the vehicle, clutch means associated with the exchanger whereby either source of power may be selectively engaged to propel the vehicle through said connections at low or high speeds, and gear shifting means for the exchanger to vary the ratio of power transmission between power receiving shafts thereof and power delivery shafts thereof.

4. In a mobile shovel, crane or excavator having a vehicle chassis supporting propelling wheels therefor, a superstructure journalled upon said chassis and adapted for rotation thereon, a prime mover source of power carried by the superstructure driven at low speeds for the propulsion thereof, and an automotive source of power carried by the chassis forwardly of said superstructure driven at relatively higher speeds for effecting travel of the vehicle, a universal power exchanger carried by the chassis, means connecting said power exchanger with said prime mover and said automotive source of power whereby said power exchanger may receive power from either said source, said exchanger comprising multiple gears, one of said gears receiving power from either said source and engaging either a second gear of the same ratio disposed medially of the first said gear and a third gear transmitting at the same rate of speed driving torque delivered thereto to a set of rear propelling wheels of the vehicle through power delivery connections, certain of said connections transmitting driving torque therefrom to a forward set of propelling wheels of the vehicle or to engage a relatively larger medial gear disposed in said exchanger whereby driving torque is transmitted to the propelled wheels at a reduced speed, clutch means associated with the exchanger whereby either source of power may be selectively engaged to propel the vehicle through said connections at initially low or high speeds, gear shifting means being provided for said exchanger whereby said first and third gears may be optionally meshed with said second gear or said relatively larger medial gear.

5. In a mobile shovel, crane or excavator having a vehicle chassis supporting propelling wheels therefor, a superstructure journalled upon said chassis and adapted for rotation thereon, a prime mover driven at low speeds for the propulsion thereof, and an automotive source of power carried by the chassis forwardly of said superstructure driven at relatively higher speeds for effecting travel of the vehicle, a universal power exchanger carried by the chassis, means connecting said power exchanger with said prime mover and said automotive source of power whereby said power exchanger may receive power from either said source, power delivering connections connected to said exchanger interchangeably receiving power from either said source, power delivering connections connected to said exchanger connected to said driving wheels of the vehicle, clutch means associated with the exchanger whereby either source of power may be selectively engaged to propel the vehicle through said connections at low or high speeds, and gear shifting means for the exchanger to vary the ratio of power transmission between power receiving shafts thereof and power delivery shafts thereof, and control means operable from the forward driver's station for disabling the clutch means normally adapted to communicate power from said prime mover to said propelling wheels.

6. In a mobile shovel, crane or excavator having a vehicle chassis supporting propelling wheels therefor, a superstructure journalled upon said chassis and adapted for rotation thereon, a prime mover source of power carried by the superstructure driven at low speeds for propulsion of said chassis and an automotive source of power carried by the chassis forwardly of said superstructure driven at relatively higher speeds for effecting travel of the vehicle, a universal power exchanger carried by the chassis, said power exchanger having a drive shaft, means associated with said power exchanger and with said sources of power and interchangeably receiving power from either said source of power, a pair of power delivering connections from said exchanger connected to said driving wheels of the vehicle, one of said connections transmitting driving torque to a set of rear propelling wheels of the vehicle and the other of said connections transmitting driving torque to a forward set of propelling wheels of the vehicle, clutch means associated with the exchanger drive shaft whereby either source of power may be selectively engaged to propel the vehicle through said connections at low or high speeds, and manually operable clutch means associated with the power delivery connections to the forward set of propelling wheels whereby the application of driving power thereto from either the prime mover or the automotive source of power may be controlled.

References Cited in the file of this patent

UNITED STATES PATENTS

| | | |
|---|---|---|
| 851,540 | Martin | Apr. 23, 1907 |
| 1,308,315 | Wilcox | July 1, 1919 |
| 1,544,775 | Polcek | July 7, 1925 |
| 1,672,212 | Hale | June 5, 1928 |
| 1,868,827 | Guy | July 26, 1932 |
| 1,925,893 | Bacon | Sept. 5, 1933 |
| 2,110,753 | Feilman et al. | Mar. 8, 1938 |
| 2,126,404 | McLean | Aug. 9, 1938 |
| 2,176,170 | Flowers | Oct. 17, 1939 |
| 2,343,800 | Ranch | Mar. 7, 1944 |
| 2,375,264 | Wagner et al. | May 8, 1945 |
| 2,382,767 | Feilman | Aug. 14, 1945 |
| 2,421,139 | Barnhart | May 27, 1947 |

FOREIGN PATENTS

| | | |
|---|---|---|
| 298,050 | Germany | Jan. 2, 1920 |